Sept. 2, 1924.
J. BARRAJA-FRAUENFELDER
FLEXIBLE CLUTCH
Filed Dec. 23, 1921
1,507,543
5 Sheets-Sheet 2
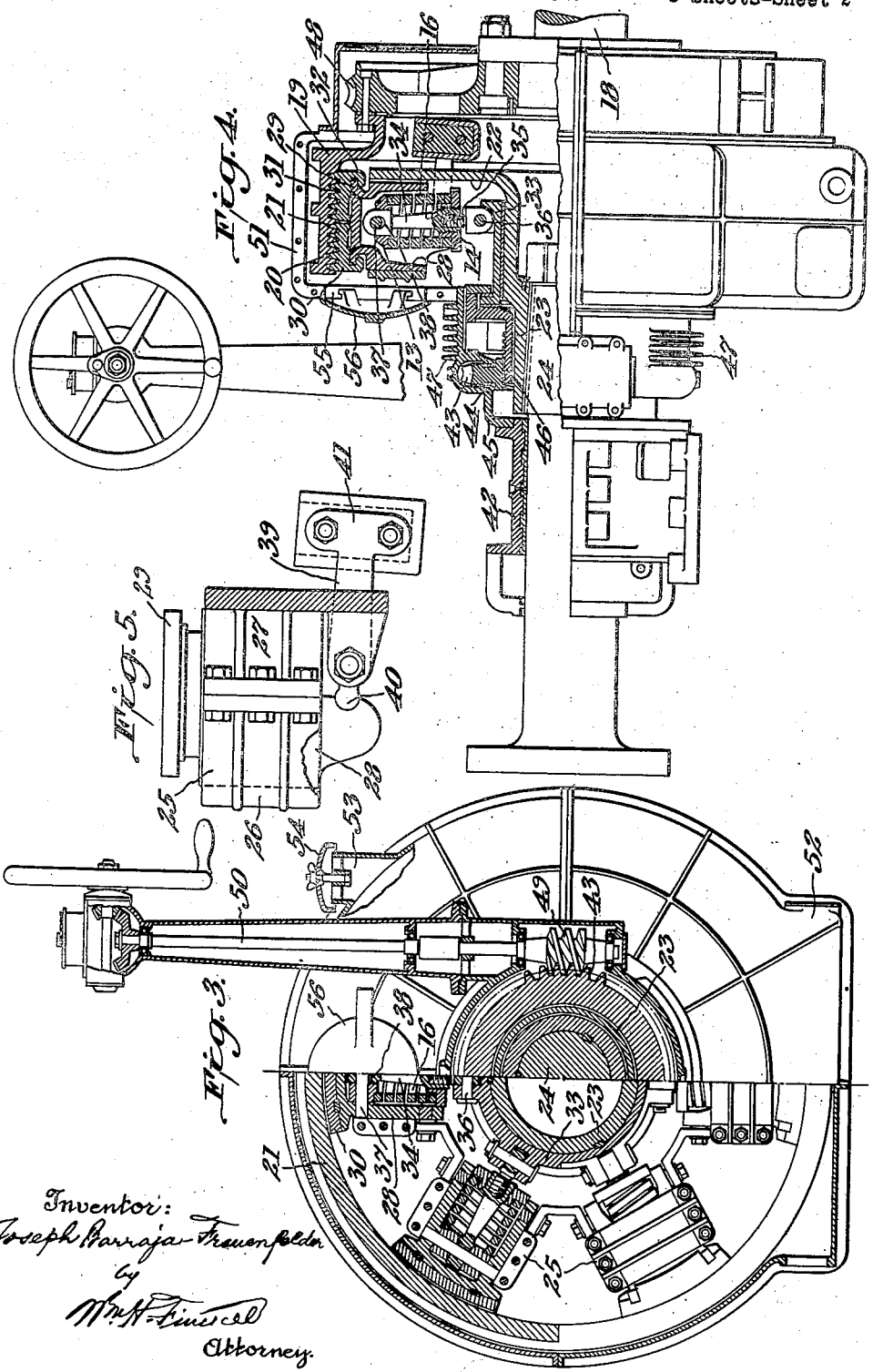

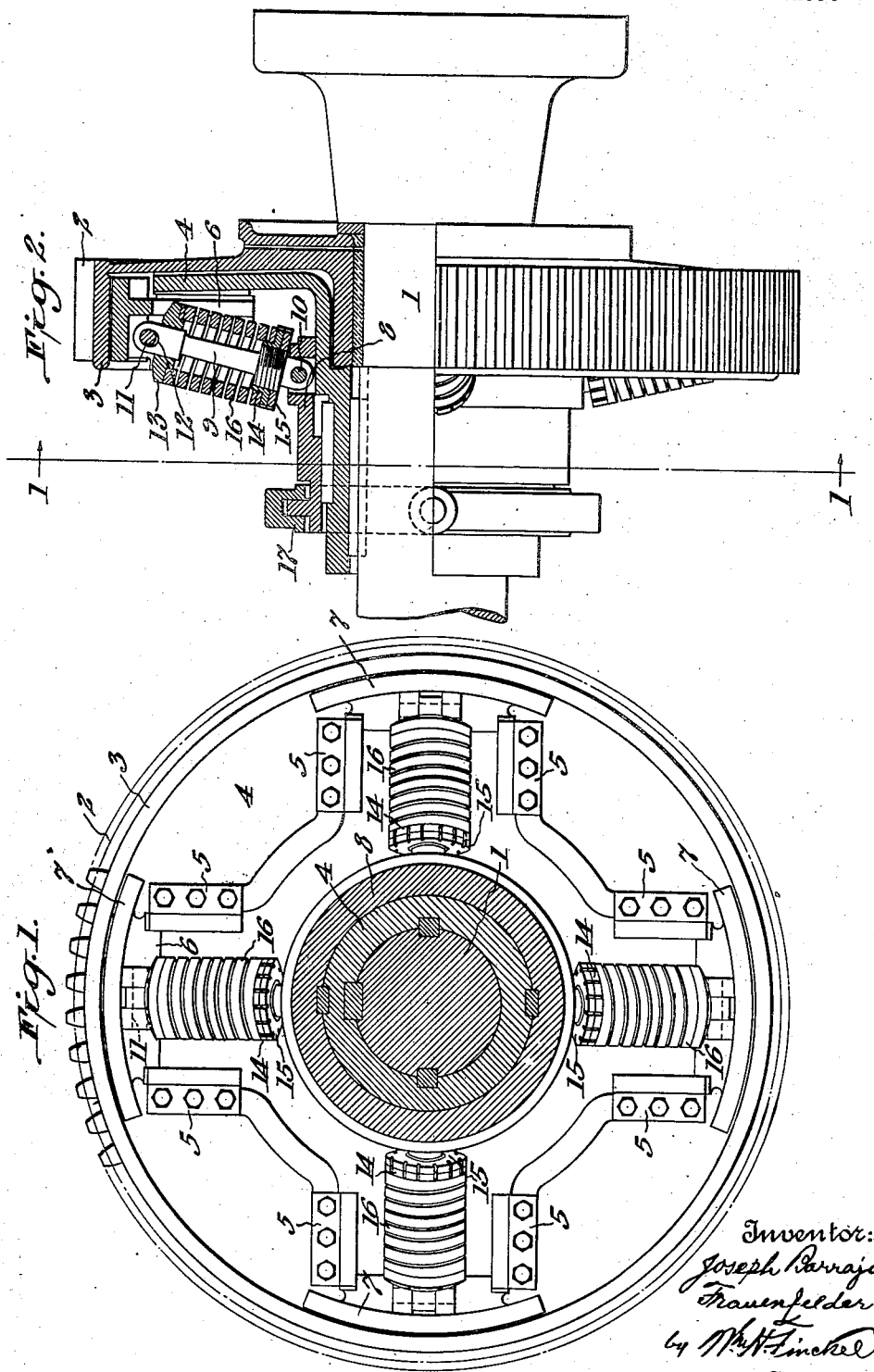

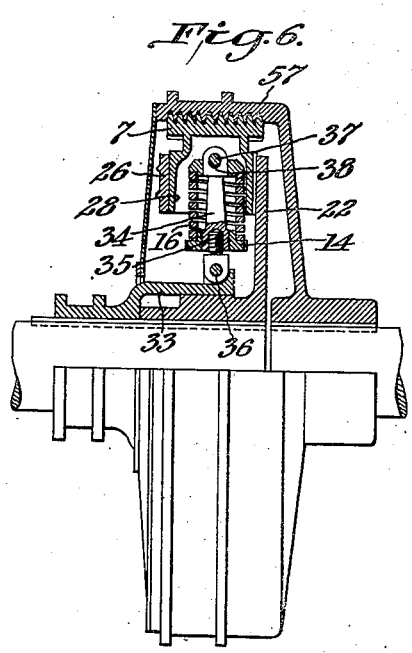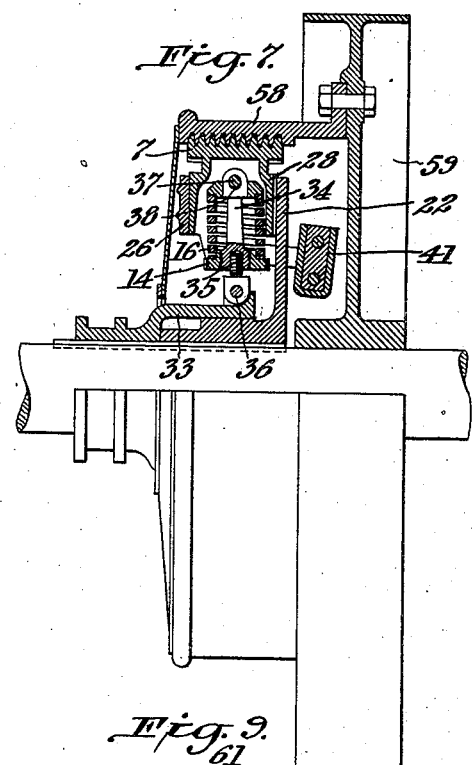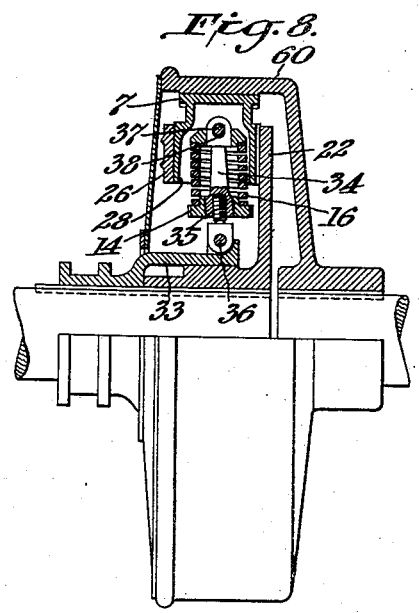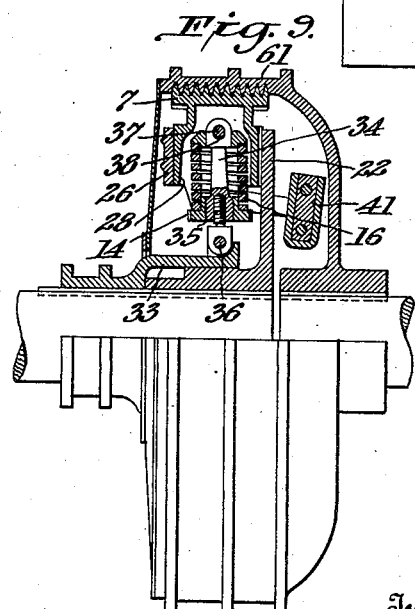

Sept. 2, 1924. 1,507,543
J. BARRAJA-FRAUENFELDER
FLEXIBLE CLUTCH
Filed Dec. 23, 1921 5 Sheets-Sheet 4
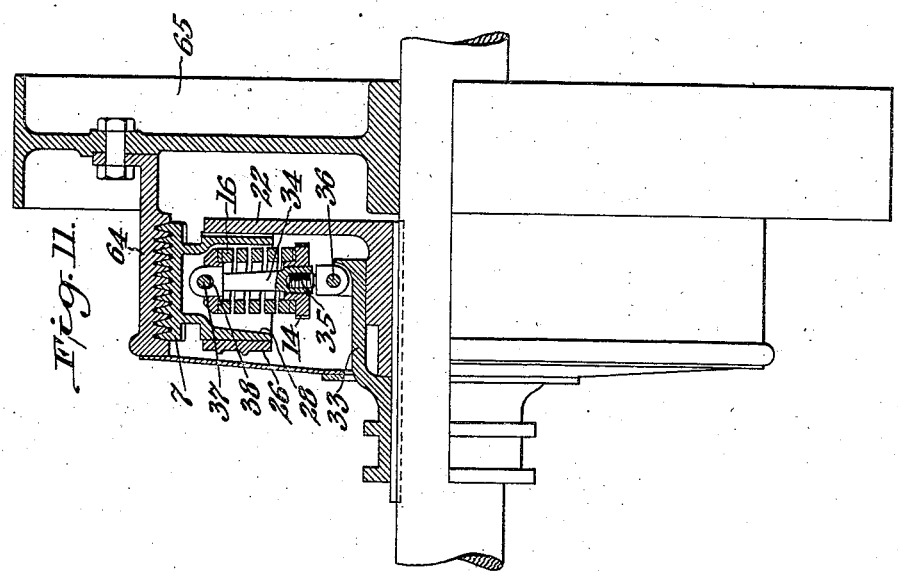
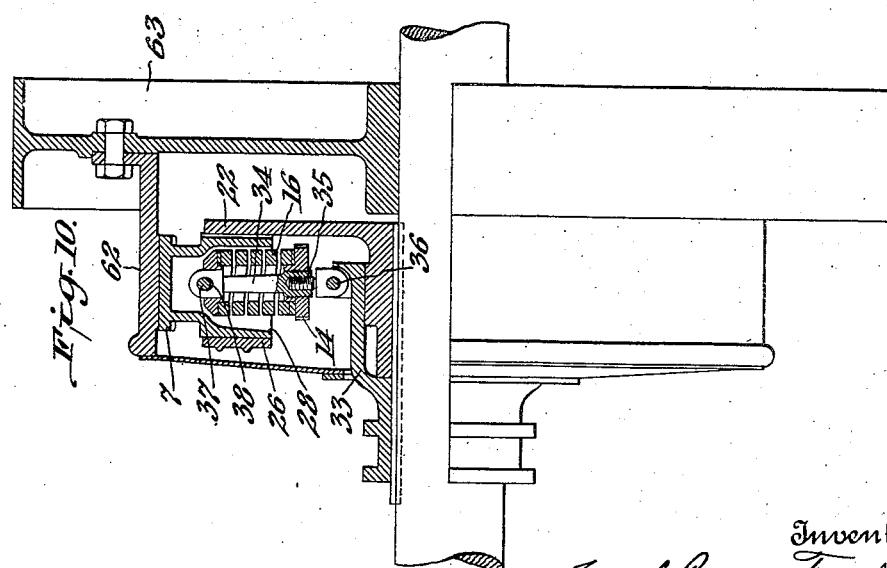
Inventor:
Joseph Barraja-Frauenfelder
by
Attorney.

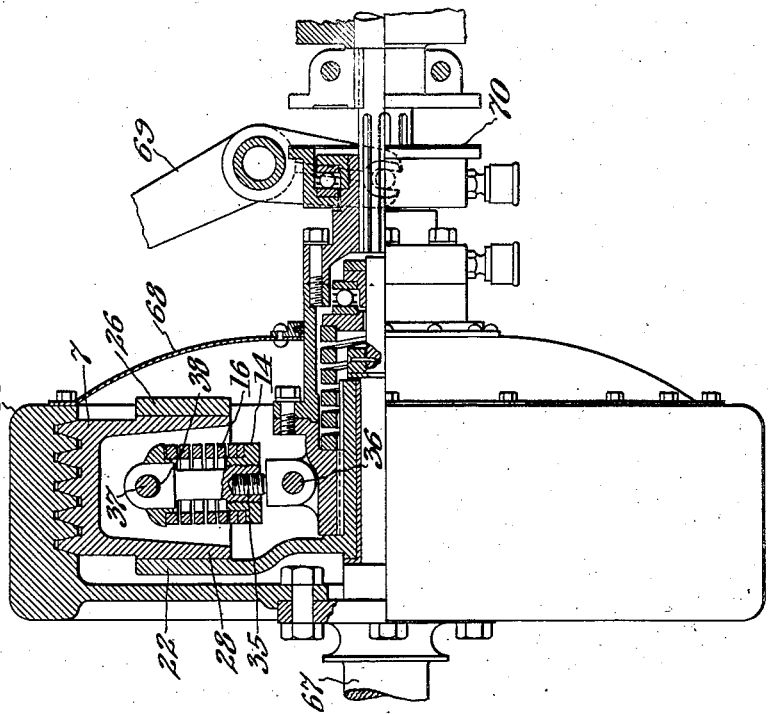
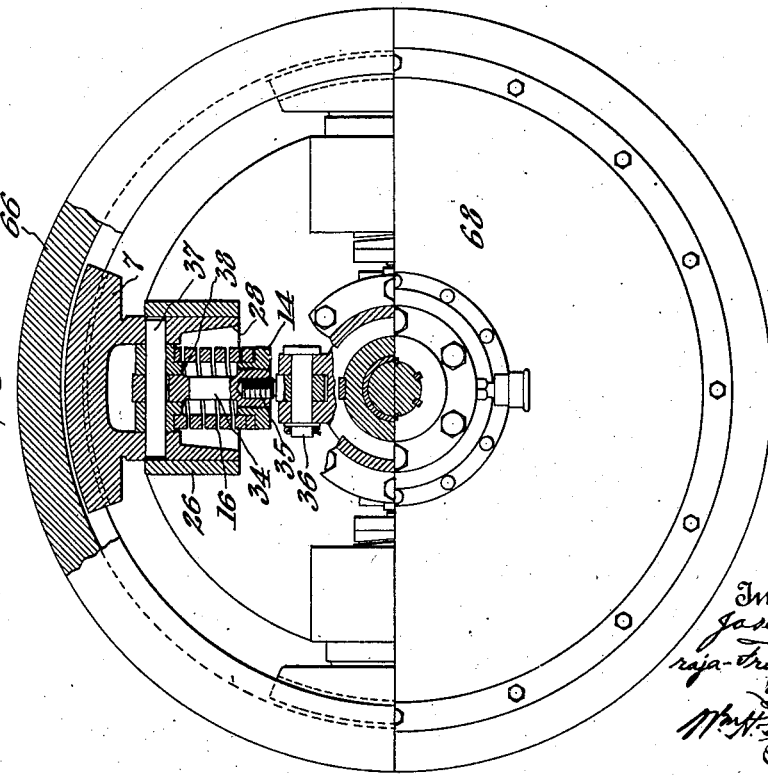

Patented Sept. 2, 1924.

1,507,543

UNITED STATES PATENT OFFICE.

JOSEPH BARRAJA-FRAUENFELDER, OF BRIDGEPORT, CONNECTICUT.

FLEXIBLE CLUTCH.

Application filed December 23, 1921. Serial No. 524,423.

*To all whom it may concern:*

Be it known that I, JOSEPH BARRAJA-FRAUENFELDER, a citizen of the United States, residing at Bridgeport, in the county of Fairfield and State of Connecticut, have invented a certain new and useful Improvement in Flexible Clutches, of which the following is a full, clear, and exact description.

The object of this invention is to provide a friction clutch capable of use on separate shafts or on a single continuous shaft to control the motion of various kinds of machines or machinery, regardless of disturbed alignment, and by reason of these features, the invention is designated herein a flexible clutch.

The invention comprises clutch shoes for use with plain or grooved rims, whether of drums, pulleys, gears or other machine elements, and shoe-carriers having a sliding motion supported by helical springs of merchant shape, and capable of adjustment as occasion or circumstances require, as I will proceed now to explain and finally claim.

In the accompanying drawings illustrating the invention, in the several figures of which like parts are similarly designated, Figure 1 is a sectional elevation of one form using a single continuous shaft, applied to a gear wheel, the section being taken on line 1—1 of Fig. 2, and Fig. 2 is a partial longitudinal section thereof. Fig. 3 is a half section and elevation of another form using separate shafts; Fig. 4 is a half longitudinal section, and Fig. 5 a section on a larger scale showing details thereof. Fig. 6 is a half longitudinal section showing a clutch coupling for a medium power grooved drum. Fig. 7 is a half longitudinal section showing a clutch coupling for a high power grooved drum adapted to a belt drive. Fig. 8 is a half longitudinal section for a clutch coupling for a low power plain drum. Fig. 9 is a half longitudinal section of a clutch coupling for a high power grooved drum, Fig. 10 is a half longitudinal section of a clutch coupling for a low power plain drum adapted to a belt drive. Fig. 11 is a half longitudinal section for a clutch coupling for a medium power grooved drum adapted to a belt drive. Fig. 12 is a half sectional elevation showing the invention adapted for use with the fly-wheel of a motor vehicle, and Fig. 13 is a half longitudinal section of the same.

It is to be understood that these illustrations are not exhaustive of the uses or adaptability of the invention, but merely serve to indicate the wide range of use of the invention, and the fact that changes in construction and arrangement are permissible within the principle of the invention as herein explained and claimed.

I am aware that prior to my invention springs were used to act upon the shoes somewhat in the manner herein disclosed, but such springs were of unusual and specially designed form, S-shaped in general profile, rather difficult and costly to make and hard to temper so as to make in quantity of uniform characteristics and they are subject to distortion in use. One feature of my invention is to use helical springs, such as found as commercial articles, of known characteristics and easily manufactured.

Referring to the example of my invention shown in Figs. 1 and 2, 1 may represent a continuous single shaft on which is mounted a gear or toothed wheel 2, having a rim 3, plain, as shown, or grooved as shown in Fig. 4 and others. 4 is a spider also mounted upon shaft 1, to which it is rigidly connected by keys, as indicated in Fig. 1, or other suitable means, and provided with radial guides 5, four, more or less, in number in which slide clutch-shoe carriers 6 upon which are mounted the clutch shoes 7 that are shaped for frictional engagement with the rim 3. Upon the shaft or a hub of the spider is slidably mounted a sleeve 8, and connecting this sleeve and the clutch shoes are links 9, pivotally attached to both, by pins 10 and 11 respectively. These links may be divided and their constituent parts connected by screwthreading so as to vary the effective length of the links, as described in connection with the links shown in Figs. 3 and 4 and others. The pins 11 at the shoe end of the links engage slots 12 in the links to permit the necessary movement of the links in the shifting of the sleeve. Each link has a cap 13 and a base 14, the latter adjustable on the link, as by screwthreading it thereon, and held in adjusted position, as by a lock-nut 15. Between the cap and base is a helical spring 16 so arranged as to be compressed against the shoe when the shoe is moved into clutching engagement with the rim. The spring may be adjusted by the means described to conform to the load to be carried. The sleeve may be provided with any suitable shifting mechanism for moving the shoes into and out of clutching engagement with the rim, same being indicated in Fig. 2 as a forked lever 17.

The construction of clutch just described is applicable also to separate shafts, one member, such as the rim member, being mounted upon a driving shaft, for example, and the other upon a driven shaft.

The described construction affords an extremely efficient and durable clutch that adapts itself readily to the varying conditions in use and with great flexibility, and one whose parts are freely accessible for repairs, and these statements apply equally to the other forms hereinafter described.

The clutch shown in Figs. 3, 4 and 5, is designed for use in the propelling machinery of boats or ships of various types. On the driving shaft 18, for example, of a Diesel engine, is a drum or other rotating body 19 having the rim 20 provided with the internal circumferential grooves 21. A spider 22 has a hub 23 mounted upon a separate shaft 24, for example, the driven shaft of an electric motor-generator and to which it may be rigidly connected by keys or other suitable means. The spider 22 is provided with the cylindrical guideways 25 made in separable parts, as, for example, with the detachable members 26 bolted or otherwise attached to the fixed parts 27 on the spider, and these guideways are open at both ends.

In the construction employing a cylindrical guideway and a cylindrical shoe-carrier with the shoe attached to the shoe-carrier, the guideway serves to connect and house the shoe and the shoe-carrier and also to carry the load which the clutch has to transmit.

By removing the movable part of the guideway the shoe carrier can be removed as already suggested, and any adjustment of the spring that is necessary may be made. It will be understood that the adjustability of the spring mount is designed to correspond with the load to be carried.

Six, more or less, such guideways may be used, to receive as many clutching elements. The guideways are made separable in order to facilitate installation of the clutching elements and access to them for repairs, adjustments and other purposes. Inasmuch as all of the clutching elements are the same in construction and operation, an explanation of one will suffice for all. 28 is a cylindrical piston-like clutch-shoe carrier, fitted to slide longitudinally in the cylindrical guideway and radially with respect to the drum. This carrier has the laterally extending flange 29 at its top to receive and engage the clutch shoe 30, the drum contact surface of which is described on an arc of a circle concentric with the drum, and externally grooved, as at 31, or otherwise formed to cooperate with the internal surface of the rim of the drum. The shoe has the depending flange 32 to engage the flange 29 of the carrier 28. This assembly of the shoe and its carrier permits of sufficient lateral movement of the shoe to enable it to center itself into the grooves in the rim; and this is an important contribution to the flexibility of my clutch.

33 is a sleeve mounted to slide longitudinally upon the hub 23. This sleeve and the shoe-carrier are connected by a link 34, made in two parts adjustably connected as by screwthreads 35. The link is pivotally connected with the sleeve by pin 36, and it is similarly connected with the shoe-carrier by a pin 37 engaging a slot 38 in the links. As in the previously described form, Figs. 1 and 2, the upper part of the link has a cap 13, and the lower part thereof has an adjustable base 14 between which is arranged the helical spring 16. The cap 13 is provided with any suitable means, such as lugs, as shown more particularly in Figs. 3 and 12, arranged to come upon opposite sides of the link end and through which a pin, as 37, passes to connect with the shoe carrier. Any pressure or pull on the link is transmitted to the shoe carrier either directly through the said pin or by means of the spring and cap through said pin. When engaging the clutch, the shoe is brought into contact with the rim before the link has completed its outward movement, which is permitted by the slot, 12 or 38, in the outer end of the link. This movement results in compressing the spring which in turn presses on the shoe carrier through the pin, the spring having been adjusted to suit the load it is intended to carry.

Pivoted to the guideway 25 is a lever 39 having at one end a finger 40 engaging the shoe-carrier and provided at its other end with a weight 41, so as to serve as a counterbalance to offset the centrifugal force of the shoe and shoe-carrier and facilitate the disengagement of the clutch when in motion.

The provision of the slot in the outer end of the link allows play between the link and shoe-carrier, and this relieves the tension on the spring when the clutch is released and allows the link to pull back the shoe when the load must be withdrawn, while when the load is engaged, the link first moves the shoe outward radially until the friction surfaces make contact, and continuing in this motion will compress the spring until the desired compression is reached in proportion to the load to be carried.

In the previously referred-to prior clutches employing an S-shaped spring, the springs must be set to be exactly the same length between connecting pins, and once set, they are not capable of adjustment, especially if the friction surfaces wear down; while in my construction when the shoes wear down, the connecting link of the construction shown in Figs. 3 and 4 and 6 to 13 inclusive and which also may be used in the construction shown in Figs. 1 and 2, may be adjusted by withdrawing the lower pin and unscrewing the lower link member until the desired length is obtained to make up for the wear.

Also in this earlier construction, the shoes are released by being pulled inward by means of the S-springs, which are thereby put under tension, and this has a tendency to distort them, while in my construction the slotted pin holes allow the pressure on the springs to be released and thereupon the shoes are pulled inward by direct pull on the links and shoe carriers. This is considered to be an important operative feature.

In that form of my invention in which separate shafts are used, the two parts of the flexible clutch, the driving member and the driven member, are not connected in such a way as to hold the center rigid. In other words, if the steady bearing 42 by some unforeseen reason drops slightly, the flexibility of the springs will permit the clutch to continue to run engaged and transmit the power without any damage to it or to the connecting part.

I have shown a worm driving mechanism for moving the sleeve 33 in and out, but the invention is not limited to any particular means for moving the sleeve, and any suitable shifting mechanism may be used. In this worm driving mechanism shown, the worm wheel 43 runs between babbitted surfaces 44 in the casing 45, and upon the shifting sleeve coupling 46, of any approved construction. In this region the greatest amount of heat is liable to be generated, and therefore the casing 45 is provided with radiating fins 47, as seen more particularly in Fig. 4.

The so-called drum 19 may be a fly-wheel. As shown in Figs. 3 and 4, it is attached to a fly-wheel, and this fly-wheel may carry a worm-wheel 48 which may serve in conjunction with the usual appliances, as a so-called barring device for turning over the engine for adjustment or examination.

The worm-wheel 43 may engage a worm 49 on a shaft 50 of a hand operating device of any usual or approved construction, but, of course, this operating device may be varied in accordance with requirements.

The clutch preferably is enclosed in an oil-tight casing 51 and I have found aluminum to be specially useful for this purpose, and this casing is provided with a sump 52 at its bottom for the collection of impurities, and with vent nozzles 53 and adjustable caps 54 therefor, so as to dissipate the hot air and gases or vapors generated within the casing. This casing also may have one or more manholes 55 for uncovering the springs and their adjuncts, and these manholes may have covers 56 to close them when desired.

Fig. 6 shows a form of my invention for medium power, in which a grooved drum 57 is used. Fig. 7 shows the invention applied to a grooved drum 58 having affixed thereto a belt pulley 59 and adapted for use for high power, and Fig. 8 shows the invention applied to a plain drum 60 for low power purposes. Fig. 9 shows the invention applied to a grooved drum 61 for high power purposes. Fig. 10 shows the invention applied to a plain drum 62 to which is attached a belt pulley 63 and designed for use for low power purposes, and Fig. 11 shows my flexible clutch applied to a grooved drum 64 having an attached belt pulley 65 for use for medium power.

In the construction shown in Figs. 6 to 11 inclusive, the shoe, either grooved or plain, is shown as made a part of its carrier, but of course the invention is not limited in this particular.

These several illustrations of the invention indicate the adaptability of the invention, but as already stated, are not intended to serve as limitations of the invention.

Referring to Figs. 12 and 13 the invention is shown as applied to the fly wheel 66 of a motor vehicle engine. 67 may indicate the crank shaft, upon which the fly wheel is mounted, 68 the oil guard, 69 the foot lever, and 70 the clutch brake, which, together with other parts not specifically described, may be of any approved type. This illustration of the invention also includes the clutch shoe made as an integral part of its carrier, but, as in the previously described forms, the invention is not limited to an integral construction.

While I have specifically referred herein to a "helical" spring, it is to be understood that the invention is not limited to the use of that form of spring but includes such structural operative and functional equivalent forms of springs which, in general terms, are compression springs, and the claims are to be understood accordingly; and moreover by the use of the word "helical" as applied to the springs, it is intended to include spiral springs wherever and whenever available. The outer member of the clutch is solid and inexpansible whereas the inner member has a radial expanding movement for engaging with or disengaging from the outer member, and in this sense and to this extent the outer member is a fixed member, although of course both the inner and the outer members rotate together when engaged. For a concise term for designating the outer member, I have referred to the same herein as a fixed member.

What I claim is:—

1. In a clutch of the character described, the combination of an outer fixed member, and an inner movable member including a shoe, a shifting device, a link interposed between the shoe and shifting device and provided with a longitudinal slot and a pin for connecting it with the shoe, and a pivot pin for connecting it with the shifting device, and a helical spring mounted upon the link and having a cap engaged by the pin that connects the link and shoe, whereby the pressure on the spring may be released and the shoe retracted by direct pull on the link and shoe.

2. In a clutch of the character described, the combination of an outer fixed member, and an inner movable member including a shoe and a hollow shoe-carrier having a loose self-adjusting connection with the shoe and adapted to permit the shoe to center itself with relation to the outer fixed member, and a compression spring in cooperative relation with the inner movable member.

3. In a clutch of the character described, the combination of an outer fixed member having an internally grooved rim, and an inner movable member including a shoe having a complementally grooved periphery for engaging the grooved rim, and a cylindrical shoe-carrier having a loose connection with the shoe to permit sufficient lateral movement of the shoe to enable it to center itself into the grooves of the rim.

4. In a clutch of the character described, the combination of an outer fixed member, and an inner movable member including a shoe, a cylindrical shoe-carrier having a self-adjusting connection between the shoe and its carrier and adapted to permit the shoe to center itself with relation to the outer fixed member, and a cylindrical guideway for said cylindrical shoe carrier.

In testimony whereof I have hereunto set my hand this 15th day of December A. D. 1921.

JOSEPH BARRAJA-FRAUENFELDER.

Witnesses:
EDGAR A. WILLIAMS,
W. G. ESMOND.